US012292947B1

United States Patent
Tang et al.

(10) Patent No.: US 12,292,947 B1
(45) Date of Patent: May 6, 2025

(54) EMISSION INVERSION SIMULATOR-BASED ARTIFICIAL INTELLIGENCE SYSTEM USING DEEP LEARNING TECHNOLOGY

(71) Applicants: CHINESE RESEARCH ACADEMY OF ENVIRONMENTAL SCIENCES, Beijing (CN); SHENZHEN QIANHAI QIMING TECHNOLOGY CO., LTD., Shenzhen (CN)

(72) Inventors: Wei Tang, Beijing (CN); Yang Li, Beijing (CN); Jian Gao, Beijing (CN); Zhongzhi Zhang, Beijing (CN); Xiaohui Du, Beijing (CN); Yang Yu, Beijing (CN); Xuezhi Dai, Beijing (CN); Jun Xu, Beijing (CN); Shijie Liu, Beijing (CN); Miaomiao Cheng, Beijing (CN); Yunlang Wang, Beijing (CN); Dazhi Wu, Shenzhen (CN)

(73) Assignees: CHINESE RESEARCH ACADEMY OF ENVIRONMENTAL SCIENCES, Beijing (CN); SHENZHEN QIANHAI QIMING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/780,327

(22) Filed: Jul. 22, 2024

(30) Foreign Application Priority Data

Jan. 29, 2024 (CN) .......................... 202410121694.8

(51) Int. Cl.
  *G06F 17/40* (2006.01)
  *G06F 5/01* (2006.01)
  *G06F 17/11* (2006.01)
(52) U.S. Cl.
  CPC ............... *G06F 17/40* (2013.01); *G06F 5/01* (2013.01); *G06F 17/11* (2013.01)

(58) Field of Classification Search
  CPC ... G06F 17/40; G06F 5/01; G06F 5/00; G06F 17/11; G06F 17/10; G06F 17/00
  See application file for complete search history.

(56) References Cited

U.S. PATENT DOCUMENTS

| 2022/0091026 A1* | 3/2022 | Scott | G01P 13/045 |
| 2023/0304981 A1* | 9/2023 | Eichenlaub | G01D 21/02 |
| 2024/0281702 A1* | 8/2024 | Thammavongsa | G06Q 50/06 |

FOREIGN PATENT DOCUMENTS

| CN | 116485048 A | 7/2023 |
| CN | 117332906 A | 1/2024 |

OTHER PUBLICATIONS

Chinese Notice of Allowance issued in Chinese Application Serial No. 202410121694.8, dated Jul. 1, 2024 with English Translation, 2 pages.

(Continued)

*Primary Examiner* — Mohamed Charioui
(74) *Attorney, Agent, or Firm* — HAYES SOLOWAY P.C.

(57) ABSTRACT

The present disclosure provides an inversion method for determining a pollution source list based on artificial intelligence and big data, an inversion system for determining the pollution source list based on artificial intelligence and big data, and applications thereof, which provides basic data support for government sectors to formulate relevant environmental protection measures. The specific technical solution employed in the present disclosure is as follows: finding out an emission source that makes the highest contribution to the pollutant concentration of any cell with an advanced 3D CNN artificial intelligence algorithm based on artificial intelligence and big data, establishing a model of the relationship between pollutant concentration and emission, and finding out the relationship between pollutant concentration and emission with machine learning technology, i.e., esti- (Continued)

mating an emission from a given pollutant concentration, and estimating a pollutant concentration from a given emission.

6 Claims, 9 Drawing Sheets

(56) References Cited

OTHER PUBLICATIONS

Chinese Official Action issued in Chinese Application Serial No. 202410121694.8, dated Jun. 15, 2024 with English Translation, 13 pages.
Puthilibai et al., An Intelligent Waste Disposal System for Hygienic Society, 2022 1st International Conference on Computational Science Technology, IEEE, Feb. 2023, pages.
Yang et al., Evaluation of the effectiveness of air pollution control measures in "2+26" cities in autumn winter; DOI:10.19674/j.cnki.issn1000-6923.20210608.009 China Environmental Science, 2021,41(10) pp. 4484-4494, 22 pages with machine translation.

* cited by examiner (a) Approximate map + grid data     (b) Grid data

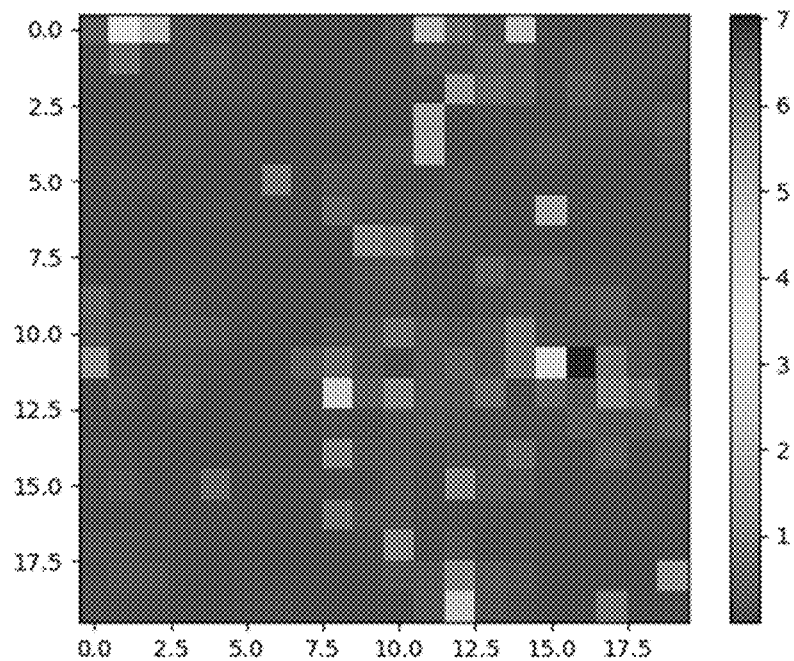
FIG. 9(a) - Given SO₂ emission
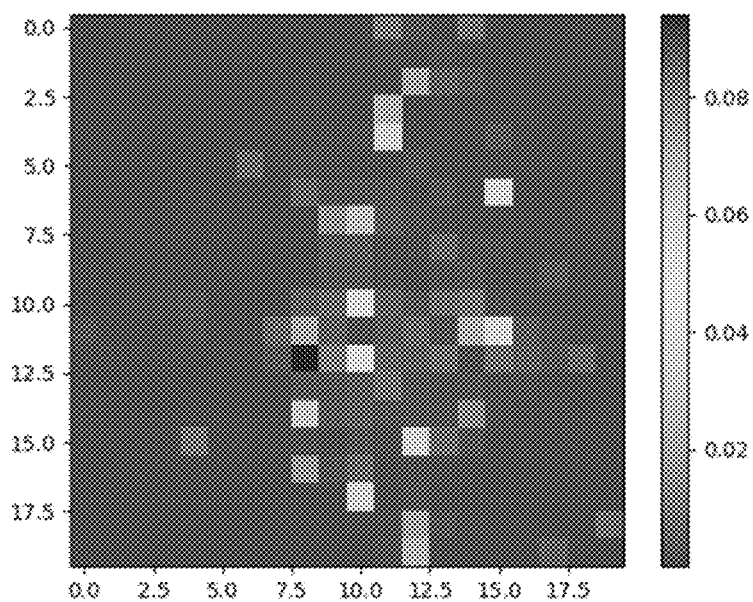
FIG. 9(b) - SO₂ emission predicted through deep learning

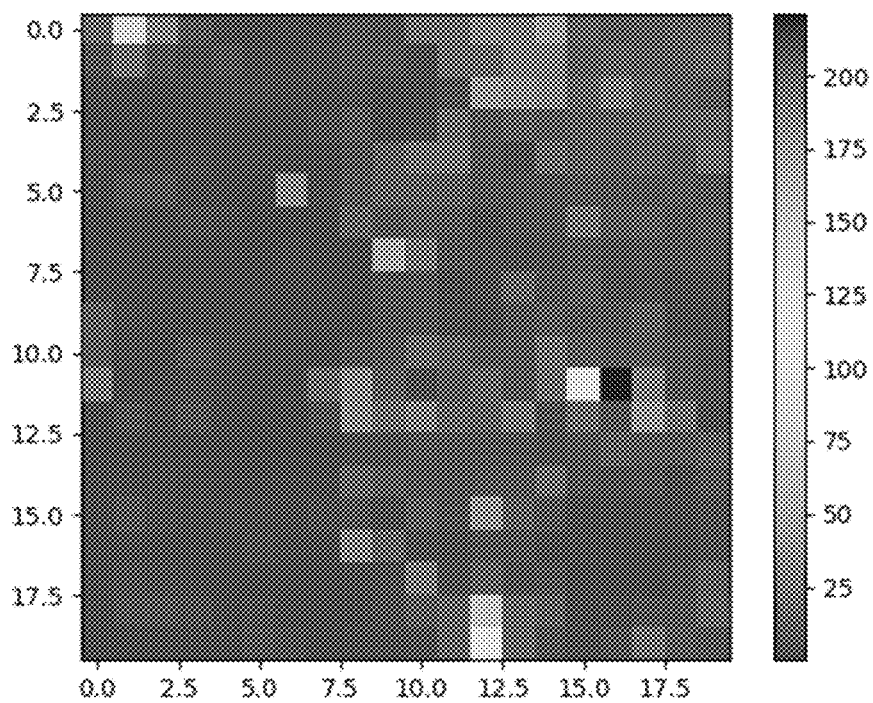
FIG. 10(a) - Given NO₂ emission
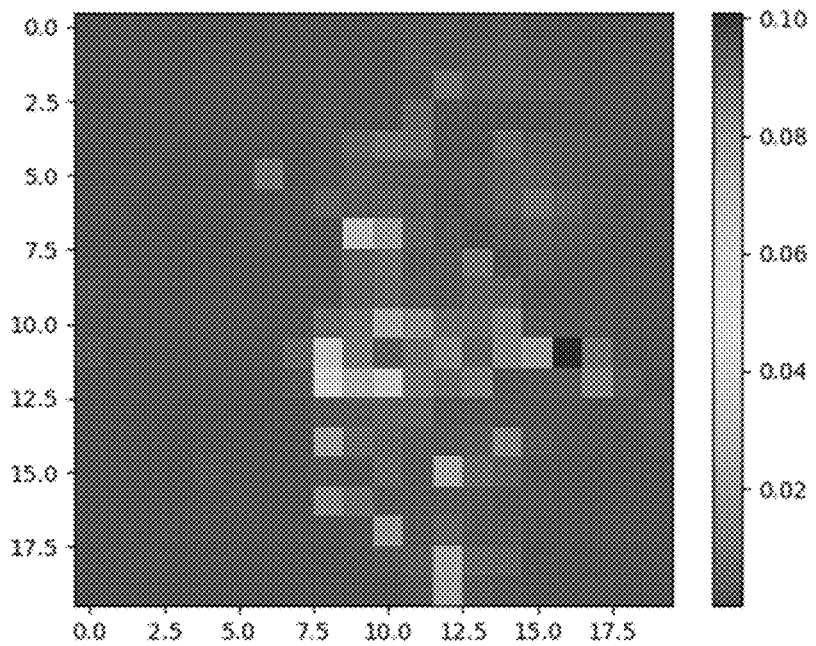
FIG. 10(b) - NO₂ emission predicted through deep learning

EMISSION INVERSION SIMULATOR-BASED ARTIFICIAL INTELLIGENCE SYSTEM USING DEEP LEARNING TECHNOLOGY

TECHNICAL FIELD

The present disclosure belongs to the technical field of environmental protection, and particularly relates to an inversion method for determining a pollution source list based on artificial intelligence and big data, an inversion system for determining a pollution source list based on artificial intelligence and big data, a simulator, a readable storage medium and a computer program product.

BACKGROUND OF THE INVENTION

The inadequate anticipation of the negative impacts of highly developed industries and bad prevention therefor have led to three global crises: resource shortage, environmental pollution and ecological damage. Environmental pollution refers to natural or man-made damages, and behaviors of adding some substances to the environment to an extent that is beyond the self-purification ability of the environment and results in harms, or the phenomenon that the ecological system and normal production and living conditions of human beings are disrupted and destroyed due to declined quality of the environment resulted from the changes of composition or state of the environment made by human factors, that is, the environment is polluted by harmful substances due to human factors, and thus the growth and reproduction of living creatures and the normal life of human beings are adversely affected.

At present, there are many kinds of air pollutions caused by man-made emissions, and chemical compositions of the air pollutants are complex, and there are many emission outlets; consequently, the pollutants spread to various places with the atmosphere and cause air pollution after they are emitted from the pollution sources. The conventional method is to characterize the degree of air pollution by manually monitoring air pollutants, but it is difficult to trace back to the sources in such a way. As a result, it is very difficult to carry out supervision in the conventional way, and the workload of pollution source investigation is very heavy.

The existing technologies for predicting air pollution and tracing the source mainly utilize a chemical transport model (CTM): CTM is an important tool for simulating and understanding how air pollutants spread, transform and settle in the atmosphere. This model combines the principles of meteorology, chemistry and physics to provide detailed insight into the behavior of air pollutants. The principles and methods are as follows:

a) Chemical reactions: CTM simulates how chemicals in the atmosphere are transformed through chemical reactions, including the interactions among oxidants, particulate matters and other pollutants.
  b) Transport process: The model further takes account of atmospheric dynamics, including factors such as wind speed, wind direction and turbulence which affect the movement and distribution of pollutants in the atmosphere.
  c) Emission sources: The inputs of the model include data of emission sources, such as industrial emission sources, vehicle exhausts and natural sources (e.g., emissions from volcanoes and plants).
  d) Weather data: Atmospheric temperature, humidity, solar radiation and other weather conditions have important effects on the chemical reactions and transport of pollutants; therefore, they are also included in the model.
  e) Numerical solution: Complex mathematical algorithms are used to solve the equations contained in the model, usually through time-splitting steps and spatial grids.

The model mainly has the following limitations:

a) Data dependency: The accuracy of CTM is highly dependent on the quality of input data, including emission source data, weather data and chemical reaction rate, etc.
  b) Computational complexity: these models are usually very complex and require a great number of computing resources and time to run, especially in the case of large area coverage or long-time simulation.
  c) Uncertainty of chemical reactions: Atmospheric chemistry is very complex, and the rates and mechanisms of many chemical reactions still have uncertainty.
  d) Scale limitation: CTM usually runs on a certain spatial and time scale. On a smaller scale (such as a street level), the accuracy of the model may be decreased.
  e) Adaptability to environmental changes: As the changes of environmental conditions (e.g., the climate changes), it may be necessary to update the model to reflect the new environmental conditions.

Based on this, at present, we need to know the air pollution concentration level is caused by emissions from which locations. Therefore, it is necessary to develop and design an inversion method for determining a pollution source list based on artificial intelligence and big data to achieve this goal.

SUMMARY OF THE INVENTION

The present disclosure aims to solve the problem of poor timeliness in updating the pollution source emission list in the prior art, so as to provide basic data support for government sectors to formulate relevant environmental protection measures.

We need to know the air pollution concentration level is caused by emissions from which locations. For example, suppose the concentration of $CO_2$ is measured, and the result of measurement indicates $C=300$ mg/m$^3$. It is desirable to have a model that can predict the specific contribution percentage of emissions from the positions to the concentration 300 mg/m$^3$. The information can be used to provide valuable suggestions for emission control. We can use the information to investigate the possible causes for the increase of pollutant concentration, or to prevent the increase of pollution level with better emission control measures.

Based on this, in the present disclosure, an inversion method for determining a pollution source list based on artificial intelligence and big data is studied and designed. The method can establish a relationship between pollutant concentration and emission, which is to say, the emission can be estimated from a given pollutant concentration, and the pollutant concentration can be estimated from a given emission; the relationship between pollutant concentration and emission can be found out through an artificial intelligence algorithm; and the error in the model can be corrected and the uncertainties can be eliminated through observed weather data and air quality data.

It should be noted that this study mainly starts from the following aspects and designs a full inversion algorithm:

Firstly, data analysis and preparation are carried out.

Specifically, preparing emission data, concentration data, weather data, and latitude and longitude information, which meet requirements, according to the requirements of the algorithm, wherein the emission is treated through 9 times of disturbance reduction, corresponding to 9 concentration files generated from different emissions (in each of different emission simulations, the meteorological field remains unchanged).

Secondly, a core algorithm is defined.

Furthermore, there are several possible ways to estimate the concentration of pollutants according to emissions with artificial intelligence algorithms: (1) utilizing machine learning such as a random forest or other methods to analyze contributions; (2) defining the problem as a finite element analysis problem of a closed cubic volume with boundary constraints, in which the concentration flows from one cell to an adjacent cell; and solving the problem through machine learning; (3) using deep learning to find out a relationship between emission and concentration. In this study, deep learning is to be used as the method for solving the problem, and the influences of emissions on the concentrations of specific cells are analyzed by sorting the contribution values of the emissions.

Finally, the research result is analyzed.

In order to verify the reliability and other effects of the inversion algorithm, in the study, finally, target cities are selected through evaluation on the result of the selected method, and the latitude and longitude information of the target cities are determined, wherein the evaluation is performed on a randomly selected timestamp, so as to analyze the relationship between emissions and concentrations of pollutants.

Thus, based on the above main research idea, the present disclosure specifically proposes solutions to solve the problems in the following aspects:

More specifically, in a first aspect, the present disclosure provides an inversion method, specifically an inversion method for determining a pollution source list based on artificial intelligence and big data, comprising:
  acquiring weather data, emission data and concentration data, and preprocessing the three types of data;
  obtaining an emission source that makes the highest contribution to the pollutant concentration of any cell with a 3DCNN artificial intelligence algorithm, and establishing a model of the relationship between pollutant concentration and emission; and
  analyzing the relationship model with an Integrated Gradients method to estimate influences of input emission data on concentrations of specific cells, and obtaining a final list inversion result.

In an implementable embodiment, the step of acquiring weather data, emission data and concentration data, and preprocessing the three types of data comprises:
  Parsing three types of data files and using timestamp information to prepare emission-meteorology-concentration samples;
  then, normalizing the three types of data to a range of 0 to 1; and
  segmenting the three types of data into three-dimensional data grids.

Furthermore, based on the above solution, the step of segmenting the three types of data into three-dimensional data grids comprises:
  setting 8 levels for emission data; setting 8×2=16 levels for concentration data; and
  for each adjacent pair of levels, merging the level data by a summation operation.

Furthermore, based on the above solution, the three-dimensional data grids segmented from the three types of data are as follows:
  for emission data, the sample grids are in a shape of (8, 20, 20);
  for concentration data, the sample grids are in a shape of (8, 20, 20); and
  for weather data, the sample grids are in a shape of (5, 20, 20).

In an implementable embodiment, the step of obtaining an emission source that makes the highest contribution to the pollutant concentration of any cell with a 3DCNN artificial intelligence algorithm and establishing a model of the relationship between pollutant concentration and emission comprises:
  reducing the dimensions of weather data from 5 to 1 by means of the process of two-dimensional convolution layers, and then activating a ReLU: weather=weather_conv(weather), weather=nn.ReLU( )(weather);
  reshaping the weather data to match the shape of the emission data in three dimensions; and
  cascading the three-dimensional emission data with the weather data to form data in a shape processed by a set of three-dimensional convolution layers having an activation function.

As a preferred solution, the present disclosure further comprises a step of predicting emission concentration through a recurrent neural network RNN with a plurality of record sequences of timestamps of emission data cascaded with weather data as inputs.

In an implementable embodiment, the step of analyzing the relationship model through an Integrated Gradients method to estimate influences of input emission data on concentrations of specific cells comprises:
  using "zero feature" state as a baseline;
  calculating gradients of model outputs with respect to input features at an actual input and the baseline input, and obtaining the gradients through back propagation in the model;
  dividing a path from the baseline to the actual input into N equally-spaced points;
  for each point in the path, calculating the gradient of model output with respect to the input features; and for each evaluation point, calculating a difference between the gradient at the actual input and the gradient at the baseline input;
  wherein the difference indicates how the significance of each feature varies along the path from the baseline to the actual input;
  multiplying the gradient differences with corresponding weights in a Gauss-Legendre quadrature formula, and summing up all weighted gradient differences to obtain a final attributable fraction of each feature;
  wherein the fraction indicates the degree of contribution made by each feature to the prediction of the model for a given input.

Particularly, the attributable fractions are normalized to ensure that a sum of the attributable fractions is equal to a difference between the prediction of the model at an actual input and the prediction of the model at the baseline input.

More specifically, in a second aspect, the present disclosure provides an inversion system, specifically an inversion system for determining a pollution source list based on artificial intelligence and big data comprising:

an acquisition model configured for acquiring weather data, emission data and concentration data and preprocessing the three types of data;

a calculation model configured for obtaining an emission source that makes the highest contribution to the pollutant concentration of any cell with a 3DCNN artificial intelligence algorithm and establishing a model of the relationship between pollutant concentration and emission; and an estimation module configured for analyzing the relationship model with an Integrated Gradients method to estimate influences of input emission data on concentrations of specific cells, and obtaining a final list inversion result.

More specifically, according to specific research, in a third aspect, the present disclosure provides a simulator, which comprises a memory and a processor, wherein the memory stores computer instructions, and the processor is configured for running the computer instructions stored in the memory, so as to implement the steps of the above-mentioned inversion method for determining a pollution source list based on artificial intelligence and big data.

The present disclosure attains the following beneficial effects:

Compared with the prior art, the method innovatively finds out an emission source that makes the highest contribution to the pollutant concentration of any cell with an advanced 3D CNN artificial intelligence algorithm based on artificial intelligence and big data, and establishes a model of the relationship between pollutant concentration and emission, and finds out the relationship between pollutant concentration and emission with machine learning technology, i.e., estimating an emission from a given pollutant concentration, and estimating a pollutant concentration from a given emission.

In view of the limitations of existing technologies for predicting air pollution and tracing the source, the present disclosure provides an inversion simulator system for determining a pollution source list based on deep learning, which achieves great improvements in precision and speed by means of an advanced artificial intelligence neural network. The present disclosure mainly solves the following limitations in the prior art:

1. Data Processing and Integration Capabilities

Problem to be solved: CTM and numerical models are highly dependent on accurate input data. Deep learning can effectively process and integrate a large number of heterogeneous data sources, such as satellite data, ground monitoring data and weather data.

Optimization method: A deep learning model can automatically extract features from complex data, reducing the need for data preprocessing and manual feature engineering.

2. Computational Efficiency

Problem to be solved: Traditional models have a high computational cost when dealing with large-scale or high-resolution data.

Optimization method: A deep learning model, especially a convolutional neural network (CNN), is more efficient in processing large-scale spatial data (e.g., satellite images).

3. Prediction Ability and Accuracy

Problem to be solved: The accuracy of traditional models may be decreased under new or changing environmental conditions.

Optimization method: A deep learning model can learn and predict more complex nonlinear relationships, thereby provides more accurate predictions in dynamic and uncertain environments.

4. Adaptability and Generalization Ability of the Model

Problem to be solved: Environmental changes may lead to failures of traditional models.

Optimization method: A deep learning model can better adapt to environmental changes through continuously learning the constantly updated data.

A related research based on the present disclosure has been applied to an inversion project for determining a pollution source list in Chengdu and Jingmen, and achieves good results.

BRIEF DESCRIPTION OF DRAWINGS

In order to explain the technical solution in the embodiments of the present disclosure or in the prior art more clearly, the accompanying drawings used in the description of the embodiments or the prior art will be introduced below briefly. Apparently, the accompanying drawings described below only illustrate some embodiments of the present disclosure. Those having ordinary skills in the art can obtain other drawings on the basis of these drawings without expending any creative labor.

FIGS. 9(a) and 9(b) show the result and analysis of a $SO_2$ model in Jingmen;

FIGS. 10(a) and 10(b) show the result and analysis of an $NO_2$ model in Jingmen.

DETAILED DESCRIPTION OF THE INVENTION

To make the object, technical solution, and advantages of the embodiments of the present disclosure understood more clearly, the technical solution in the embodiments of the present disclosure will be detailed clearly and completely, in conjunction with the specific design process in the present disclosure and the accompanying drawings in the embodiments.

The overall research design will be described below completely in three stages: a data analysis and processing stage, an algorithm research stage, and an estimation stage. Please refer to FIGS. 1-11.

I. Research in Data Analysis and Processing Stage 1.1 Data Characteristics

Figure 1:
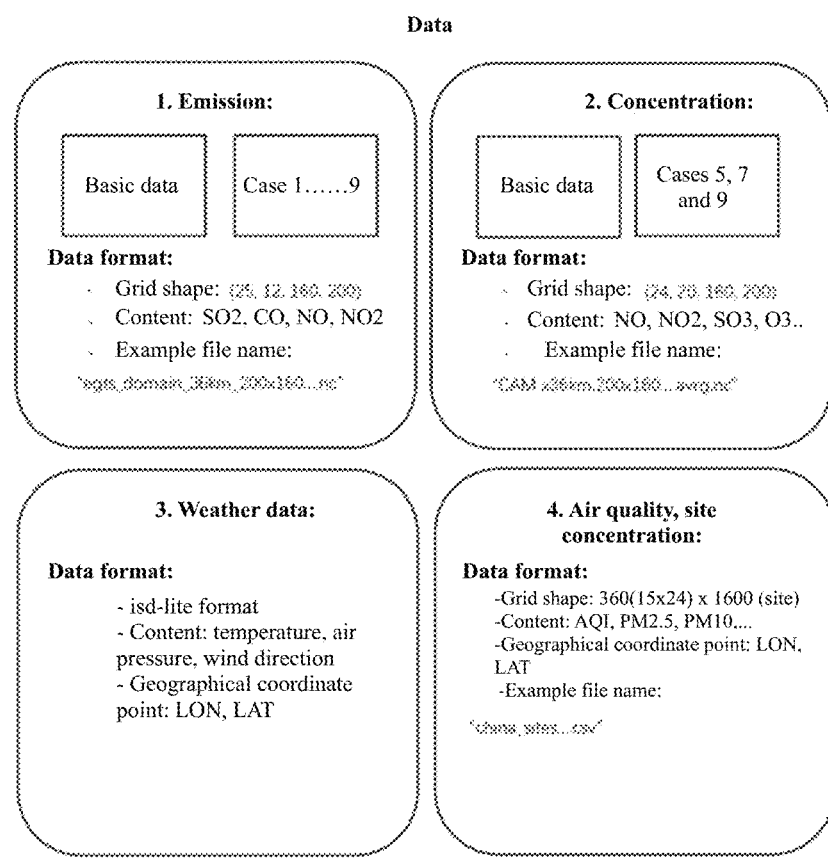
FIG. 1 is a storage structure diagram of available data (in an example of 160×200 grids)

Please refer to FIG. 1. All the emission data, whether data and concentration data involved in this method are in a three-dimensional format, and there is a theoretical correlation among them. The data has the following characteristics:
(1) Emission data: three-dimensional grid data recorded on an hourly basis for each pollutant. For each timestamp-pollutant pair, the data shape is (number of layers in height, number of latitudinal grids, number of longitudinal grids).
(2) Concentration data: three-dimensional grid data recorded on an hourly basis for each pollutant. For each timestamp-pollutant pair, the data shape is (number of layers in height, number of latitudinal grids, number of longitudinal grids).
(3) Weather data: A set of two-dimensional grid data, in which different types of weather data (air temperature, dew point temperature, air pressure, wind direction and wind speed) are recorded per 3 hours. For each type of weather data, the data shape is (number of latitudinal grids, number of longitudinal grids); since there are five types of data, the overall shape is (number of data types, number of latitudinal grids, number of longitudinal grids).
(4) For grid data (number of latitudinal grids, number of longitudinal grids), each cell provides LAT and LON location information. Based on the information, the locations of weather sites have been sorted to align with the corresponding grid cells, so as to align the emission-concentration data grids with the weather data grids.
(5) The emissions are treated through 9 times of disturbance reduction, corresponding to 9 concentration files generated from different emissions. However, in each different emission simulation, the meteorological field remains unchanged, and only the data with disturbance numbers 5, 7 and 9 are provided.

1.2 Data Processing

In view of the above characteristics, the data is preprocessed for use in a deep learning algorithm. The data samples are in sizes of (12, 160, 200), (20, 160, 200) and (5, 199, 209), which are too large to be used directly in training a deep neural network (CNN), and thus the model will be too huge and may be over-fitted easily, resulting in a solution that is inflexible and difficult for training.

Therefore, in order to prepare data for training a DNN, the following steps are performed:
(1) All data files are parsed, and timestamp information is used to prepare an emission-weather-concentration table. Since the weather records are made once every 3 hours, it is decided to use every third record for the emission-concentration file. Therefore, for each day, 7 records are selected for all data types. For a reference case, 2,000 timestamped records (in about 285 days (2,000/7)) are selected; for disturbance numbers 5, 7 and 9, 1,500 timestamped records are selected. About 6,500 timestamped records are totally prepared as emission-weather-concentration samples.
(2) The weather data is normalized (normalized by mean and standard deviation), and then the data is normalized to the range of 0 to 1, and the emission and concentration data is also normalized to the range of 0 to 1.
(3) In order to use the data in DNN training, it is decided to subdivide the data grids into smaller three-dimensional data grids, which is achieved by generating random sub-grids in the horizontal direction (160, 200).

A sliding frame with a kernel size of 20 is used, and the actual size of a single frame is 20×36 km=720 km, and a frame in size of 720×720 km can cover any area of interest for analysis. In addition, the sliding frame can always cover the investigated locations. Therefore, the sliding frame method can be used to perform emission-concentration analysis at any location.
(4) The data grids are further subdivided in the vertical (hierarchical) direction. Since two different DNN model architectures are tested in this method, there are two variants for subdividing the grid data in the vertical direction:
a) For a totally connected linear NN: The emission data and the concentration data are subdivided into sub-grids in size of 3 and sub-grids in size of 5 respectively. The sub-grids are very small, because for a totally connected model, the model size can be significantly increased if the data resolution is high.

Therefore, for the emission data, the sample grids are in a shape of (3, 20, 20); for the concentration data, the sample grids are in a shape of (5, 20, 20); and for the weather data, the sample grids are in a shape of (5, 20, 20).
b) For the model architecture based on 3D CNN, both the emission data grids and the concentration data grids are subdivided into 8 levels in the vertical direction. For the emission, eight levels of the raw data are considered in this method. For the concentration, 8×2=16 levels of the raw data are considered in this method: For each adjacent level pair, the data at the levels are merged through a summation operation (e.g., the first level and the second level are merged into a level, and their values are combined through a summation operation). The purpose for doing so is to reduce the data size; whereas, almost all data in the vertical direction are considered.

Therefore, for the emission data, the sample grids are in a shape of (8, 20, 20); for the concentration data, the sample grids are in a shape of (8, 20, 20); and for the weather data, the sample grids are in a shape of (5, 20, 20).

II. Algorithm Study Stage

In this method, the concentrations of pollutants are estimated with an artificial intelligence algorithm according to the emissions, deep learning is used as a method to solve the problem, and the influences of emissions on the concentrations of specific cells are analyzed by sorting the contribution values of the emissions. The process mainly includes the following steps:
(1) training a DNN to predict concentration, with emission data and weather data as inputs;
(2) analyzing the model to estimate the influences of input emission data on specific cells of concentration grid, by using an Integrated Gradients method;
(3) analyzing the model to estimate the influences of specific elements in the input emission grids on the output concentrations, and use partial derivative estimation to complete this step.

The specific steps are described as follows:

The first step is to design and train a DNN, which may take emission data and weather data as inputs and predict concentration, and employs a Pytorch framework. In this method, two different DNN model architectures are used to compare the results of them, and then a better architecture is chosen: linear totally connected DNN architecture and 3DCNN (Convolutional NN) based architecture.

The linear totally connected DNN model has a simple structure:
(1) Input feature size (in_size): 3,200 features: emission (3, 20, 20) that equals to 1,200 features plus weather data (5, 20, 20) that equals to 2,000 features;
(2) Output feature size (output_size): 2,000 features: concentration (5, 20, 20) equals to 2,000 features;
(3) In_size=in size/4=800
nn.Linear(in_size, inner_size)—Linear layer;
nn.BatchNorm1d( )—Batch normalizationfu;
nn.ReLU( )—Activation function;
nn.Dropout;
nn.Linear (inner_size, output_size)—Linear layer;

In addition, this method uses the mean square error (nn.MSELoss( )) as the evaluation criterion, and uses an Adam optimizer, and the learning rate is $lr=1e^{-5}$. The model uses different parameters for multiple trainings.

Figure 2A:
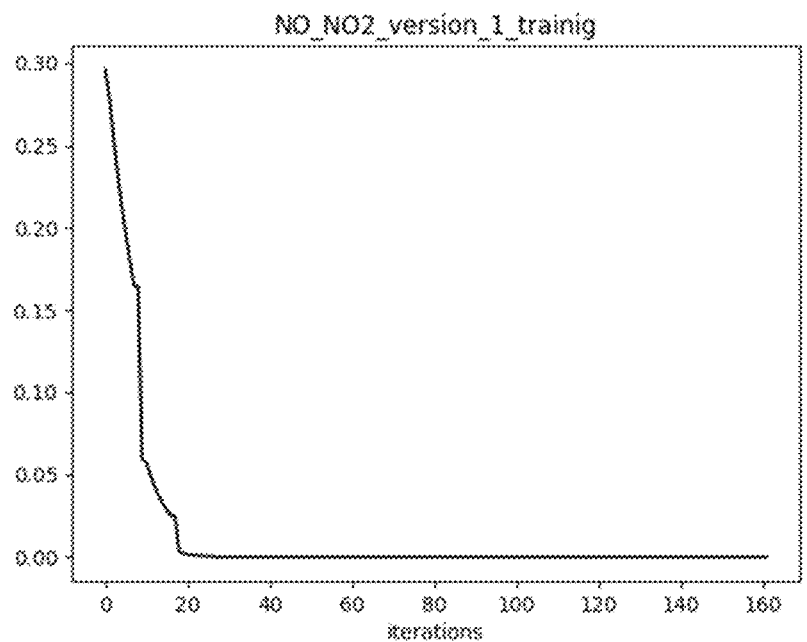
FIGS. 2(a) and 2(b) respectively show the training and verification losses during the training of a "NO"-"$NO_2$" model.
Figure 2B:
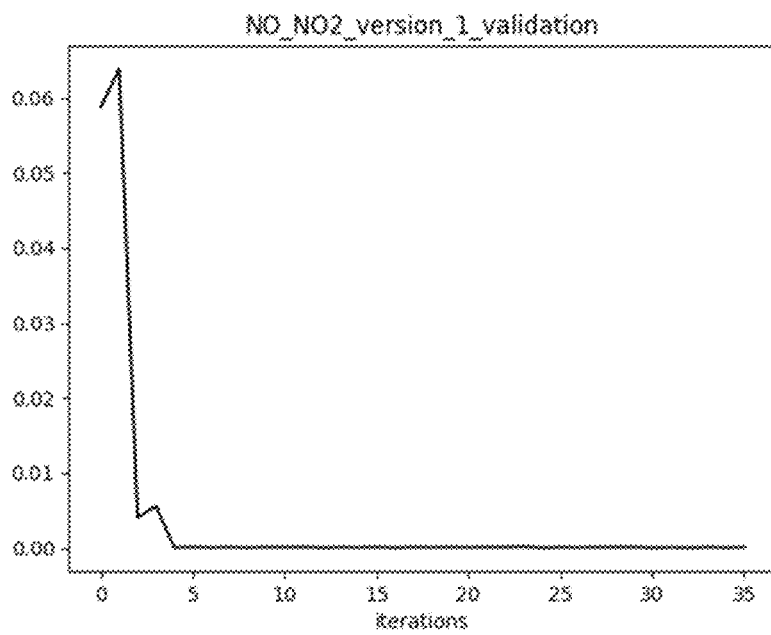

The models of two pairs of pollutants are trained: "NO" emission-"$NO_2$" concentration; "$SO_2$" emission-"$SO_2$" concentration. FIGS. 2(a) and 2(b) respectively show the training and verification losses during the training of a "NO"-"$NO_2$" model: both the training loss and the verification loss are decreased, which indicates that the training process is normal.

The model (EmissionConcentrCNNModel(nn.Module)) has the following layers:
(1) An input layer, which flattens two input grids into one-dimensional vectors and connects them;
(2) Three totally connected layers, each of which is connected with a BatchNorm1d layer;
(3) A three-dimensional up-sampling layer, which reshapes the data into (8, 20, 20) shape;
(4) Four three-dimensional convolution layers, each of which is connected with a BatchNorm3d layer;
(5) A final three-dimensional convolution layer, which is used as an output layer.

It can be seen that such an architecture makes full use of three-dimensional convolution layers to capture the three-dimensional spatial relationship between inputs and outputs. Compared with the totally connected network, the parameters are much fewer.

```
weather_conv=nn.Conv2d(in_channels=5, out_channels=1, kernel_size=5, stride=1, padding=2)
conv1=nn.Conv3d(in_channels=2, out_channels=24, kernel_size=3, stride=1, padding=1)
conv2=nn.Conv3d(in_channels=24, out_channels=48, kernel_size=3, stride=2, padding=1)
conv3=nn.Conv3d(in_channels=48, out_channels=64, kernel_size=3, stride=1, padding=1)
conv4=nn.Conv3d(in_channels=64, out_channels=64, kernel_size=3, stride=1, padding=1)
pool=nn.MaxPool3d(kernel_size=2, stride=2, return_indices=True)
transpose_conv=nn.ConvTranspose3d(in_channels=64, out_channels=12, kernel_size=3, stride=1, padding=1)
unpool = nn.MaxUnpool3d(kernel_size=2, stride=2)
transpose_conv_final = nn.ConvTranspose3d(in_channels=12, out_channels=1, kernel_size=4, stride=2, padding=1)
drop_20 = nn.Dropout(p=0.2)
drop_30 = nn.Dropout(p=0.3)
```

Figure 3:
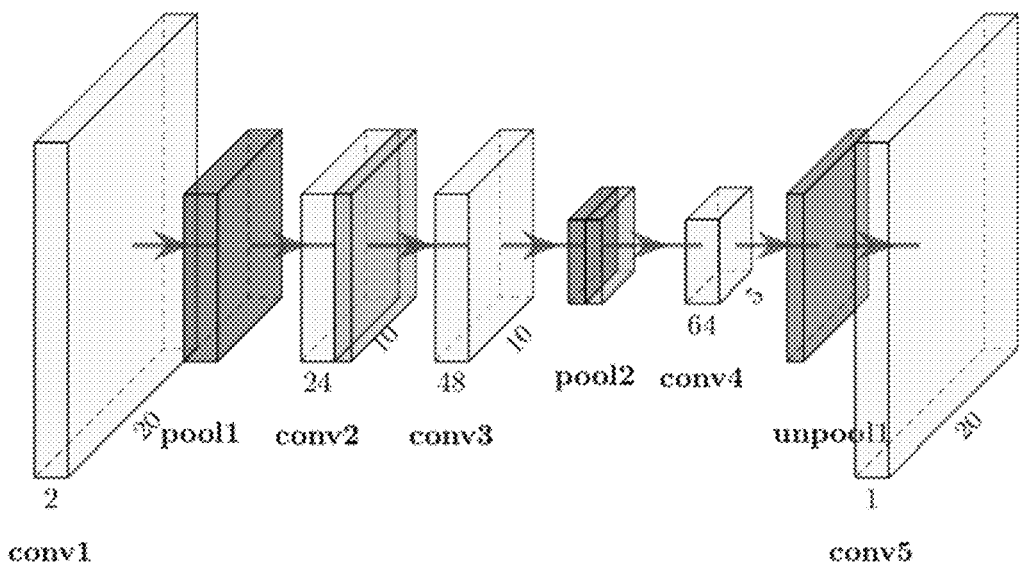
FIG. 3 is a neural network architecture diagram.
Figure 4A:
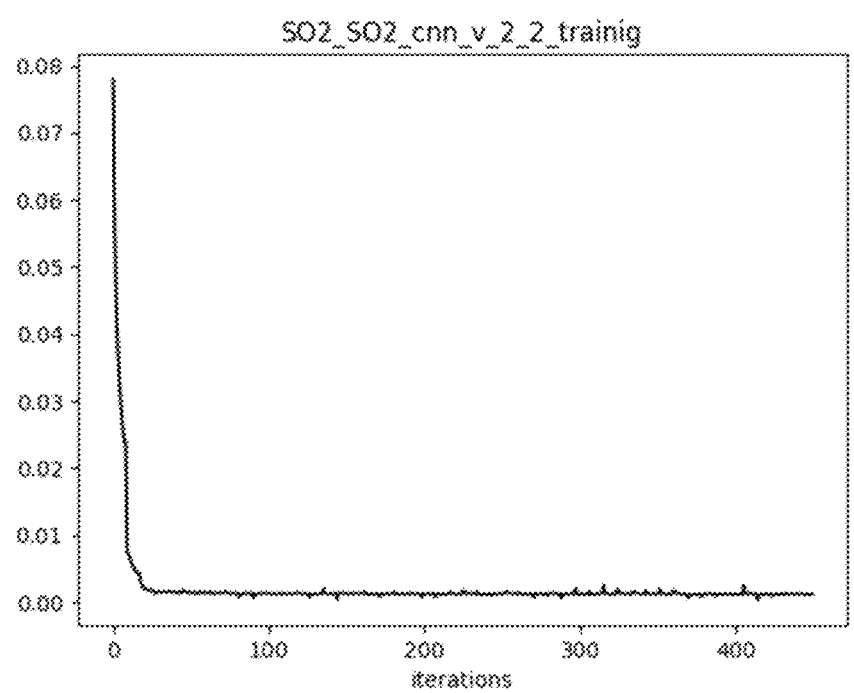
FIG. 4(a) shows the loss record of 3D CNN structure: training loss.
Figure 4B:
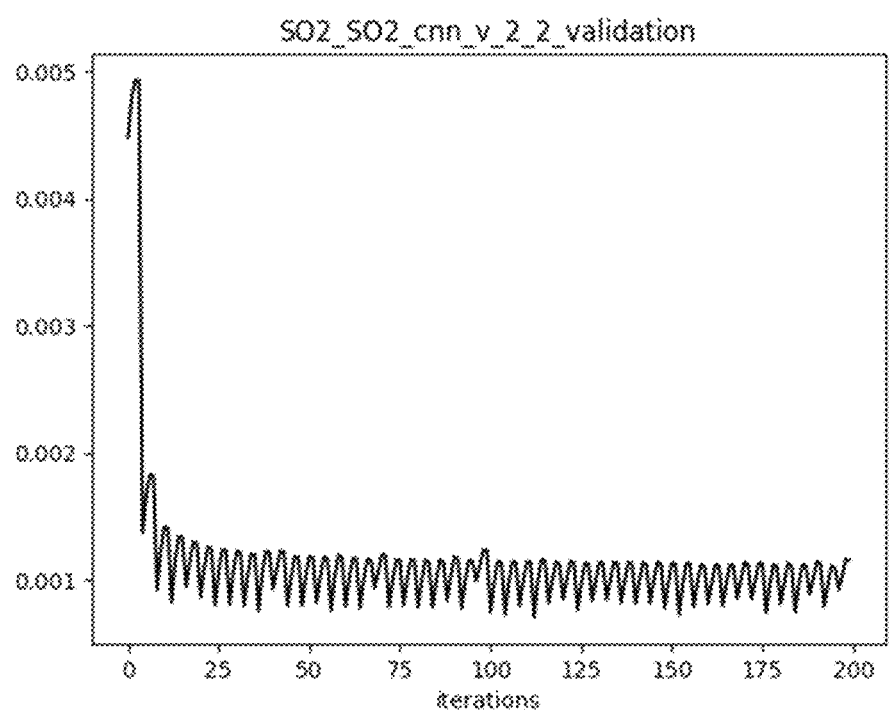
FIG. 4(b) shows the loss record of 3D CNN structure: verification loss.

As shown in FIG. 3, the data processing is as follows:

The dimensions of the weather data are reduced from 5 to 1 by processing the weather data through two-dimensional convolution layers, and then a ReLU is activated:
weather=weather_conv(weather)
weather=nn.ReLU( )(weather)

The weather data is reshaped to match the shape of the three-dimensional emission data (batch_size, channel=1, depth=8, H=20, W=20). The weather data in each slice in the depth direction is identical.

The three-dimensional emission data is cascaded with weather data to form a shape (batch_size, channel=2, depth=8, H=20, W=20). Then the data is processed through a set of three-dimensional convolution layers having an activation function. The depth direction represents the horizontal direction of the data, and the value is 8. The input channels are 2, which equals to 1 plus 1:

```
x = torch.cat((emission, weather), dim=1)
x = conv1(x)
x = nn.ReLU( )(x)
At conv2 layer, the sparse resolution is reduced from 20×20 to 10×10
x = conv2(x)
x = nn.ReLU( )(x)
Dropout is applied to improve the model
x = drop_20(x)
x = conv3(x)
x = nn.ReLU( )(x)
Pooling is applied to reduce the sparse resolution from 10×10 to 5×5
x, indices3 =pool(x)
Dropout is applied to improve the model
x = drop_30(x)
x = conv4(x)
x = nn.ReLU( )(x)
Unpooling is applied to upscale the resolution from 5×5 to 10×10
x = unpool(x, indices3)
Then, transpose convolutional operation is applied
x = stranspose_conv(x)
x = nn.ReLU( )(x)
Dropout is applied to improve the model
x = drop_20(x)
At the final transpose layer, the sparse dimensionality is upsacled from 10×10 to 20×20
x = transpose_conv_final(x)
```

This method uses the mean square error (nn.MSELoss( )) as the evaluation criterion, and uses an Adam optimizer, the learning rate is $lr=1e^{-5}$. The model uses different parameters for multiple trainings, and Batch Size is set to 28.

The models of two pairs of pollutants are trained: "NO" emission-"$NO_2$" concentration; "$SO_2$" emission-"$SO_2$" concentration. In the training process, the data set is divided into training data and verification data, which are 85% and 15% respectively. In the training process, uniformly distributed random noise is added to the emission data and weather data. FIGS. 5(a) and 5(b) respectively show the training and verification losses during the training of a "$SO_2$"-"$SO_2$" model; both the training loss and the verification loss are reduced, which indicates that the training process is normal.

A linear totally connected model is a traditional neural network architecture, in which every neuron in one layer is connected to every neuron in the next layer. For three-dimensional data, this architecture regards an entire volume as a flattened one-dimensional sequence, resulting in loss of the spatial relationship between voxels. Therefore, this method ignores the spatial structure and does not utilize any three-dimensional pattern existing in the data.

On the other hand, a 3D CNN is specially designed to effectively and efficiently process three-dimensional grid data. It uses three-dimensional convolution to preserve the spatial relationship between adjacent voxels in the volume. The three-dimensional convolution kernel slides along all the three dimensions of the input volume and captures local three-dimensional patterns, such as edges, corners and more complex features. A pooling layer (e.g., maximum pooling) is used to downsample the spatial dimensions, allowing the network to effectively learn the feature hierarchy.

After the training loss and verification loss tests (FIGS. 2 and 4), it is concluded that the 3D CNN-based model has high accuracy for the test data. Therefore, this method will only use a 3D CNN to study the relationship between pollutant concentration and emission, because it will give more stable results. In addition to the simple linear model or 3D CNN, the method also designs a GRU recurrent neural network (RNN), which uses multiple timestamped record sequences of emission data+weather data as inputs to predict concentration. This model can also achieve a higher accuracy through training.

It should be noted: once the DNN model is trained, it can be analyzed to find out the relationship between inputs and outputs, and estimate how different elements of the input emission vector affect the resultant concentration at specific locations. This problem has some similarities with the problem considered in the cooperative game theory. The cooperative game theory is a branch of the game theory, and it studies how individuals or players cooperate to achieve a mutually beneficial result. It focuses on scenarios where the players can form alliances and work together to maximize their common interests. In a cooperative game, the value of the result depends on the cooperation among the players, rather than merely depends on the strategies they adopt individually. The cooperative game theory can be applied in various fields, including Economics, Political Science, Operational Research, and Multi-Agent Systems, and is helpful for understanding and analyzing situations where cooperation is crucial to achieve an optimal result.

III. Estimation Stage

The model is analyzed with an Integrated Gradients method to estimate the influences of input emission data on specific cells of concentration grids.

There are several possible ways to solve this problem in DNN analysis. Estimating the influences of input features on specific output features is a key aspect to understand the behavior and decision-making process of a machine learning model. At present, many methods are known to solve this explanatory challenge. In this method, the Integrated Gradients method is used to study the correlation between pollutant concentration and emission. The Integrated Gradients method is an interpretable algorithm of axiomatic model, and it gives a significance score to each input feature by approximating a gradient integral of the model output with respect to the input along a path (straight line) from a given baseline/reference to the input. The baseline may be provided as an input parameter to an attribution method. In order to approximate the integral, a variant of Riemann Sum or Gauss-Legendre quadrature formula may be used.

The basic working principle of the formula is to calculate an integral of the gradient of the model output with respect to the input features. The Gauss-Legendre quadrature formula is used to approximate the integral. The process of using the IG method includes the following steps:

(1) Step 1: Defining a Baseline

A baseline input is selected as the starting point of the attribution process. The baseline should have the same dimensions as the input data, representing a "zero feature" state. Usually, the baseline is set to a fully black image (all pixels or voxels are set to zero) or a randomly generated noise sample. This method uses the "zero feature" state as a baseline.

(2) Step 2: Calculating a Gradient

A gradient of model output with respect to input features is calculated at an actual input and the baseline input. In this step, the gradient is obtained through back propagation in the model.

(3) Step 3: Approximating an Integral

The Gauss-Legendre quadrature formula is used to approximate the integral. This formula allows to use evaluation points and weights of weighted summation to approximate the definite integral of the function. The number of steps or the number of evaluation points (N) is selected to approximate the integral. A common value of N is 50 or 100, but it can be adjusted according to the calculation constraints and the required accuracy. In this method, N=50 is used. A path from the baseline to the actual input is divided into N equally-spaced points. For each point in the path, the gradient of model output with respect to the input features is calculated. For each evaluation point, a difference between the gradient at the actual input and the gradient at the baseline input is calculated; the difference indicates how the significance of each feature changes along the path from the baseline to the actual input.

(4) Step 4: The gradient differences are multiplied with the corresponding weights in the Gauss-Legendre quadrature formula. These weights are predetermined and depend on the number of evaluation points (N). All the weighted gradient differences are summed to obtain a final attributable fraction of each feature. These fractions indicate the degree of contribution made by each feature to the prediction of the model for a given input.

(5) Step 5 (optional): The attributable fractions may be normalized to ensure that a sum of the attributable fractions is equal to a difference between the prediction of the model at an actual input and the prediction of the model at the baseline input. The normalization ensures that the attribution is in the same dimension as the model output.

The Integrated Gradients method is implemented in an "attr" module in the "captum" in Python library. The following parameters must be provided to using the IntegratedGradients class:

(1) _forward_func_(callable): A forward function of the model (2) _multiply_by_inputs_(Boolean, optional): It indicates whether the multiplier inputted to the model is considered in the final attributable fraction. They also referred to as local attribution and global attribution in literature. If the inputted multiplier is not considered, such a attribution method is also referred to as local attribution. If the input parameter is considered, such a attribution method is referred to as global attribution. For this method, global attribution is essential, and must be considered.

An "attribute" method is called to calculate the significance score of each input feature, and estimate the influence attribution of each element of the input vector of emission to specific concentration elements. The attribution may be positive (increasing concentration) or negative (decreasing concentration). As a baseline (reference for gradient calculation), zero or the input at the previous timestamp may be used. In this method, zero is used, so that the influence of input features on the prediction of the model can be calculated by using the API provided by the Integrated Gradients method. Thirdly, the partial derivative is used to estimate the influence of specific elements of the input emission grids on the output concentration. The results provided here are not highly accurate, and are only for the linear totally connected model, to demonstrate the possibility of such analysis.

To estimate the influence of specific elements of the input vector on the output feature vector, the concept of partial derivative may be used. Specifically, the partial derivative of the output feature vector with respect to a specific element of the input vector may be calculated. Therefore, for each cell of the 3D grids of concentration (each element of the feature vector outputted by the model), the gradient with respect to a specific input element of the emission grids is calculated. Then, the gradients calculated for all concentration cells can be sorted to select the Top_k cells having the highest value. These Top_k concentration elements indicate which cells in the concentration grids are affected to the maximum extent by specific emission elements, which is expressed as the indexes of target emission cells.

The Integrated Gradients (IG) has the following advantages when applied to a 3D Convolutional Neural Network (3D CNN) model to estimate the influence on features:

(1) Global interpretability: IG provides feature attribution for the entire three-dimensional input volume. Such global interpretability is helpful for understanding the behaviors of the model in the entire spatial domain and identifying the regions or structures that are very important for model prediction in the three-dimensional volume.

(2) Model independence: IG is a model-independent method, which means that it can be applied to any black box model, including 3D CNN. Such flexibility enables researchers and practitioners to interpret and understand a 3D CNN model without accessing the internal architecture or parameters of the model.

(3) Consistence with gradient: IG utilizes gradients, which are clearly defined for differentiable models such as 3D CNN. This ensures that the attribution provided by IG is consistent with the sensitivity of the model to the change of input features, thus making the interpretation more reliable.

(4) Capturing nonlinear relationships: A 3D CNN can learn the complex nonlinear relationship between input features and prediction. IG considers such nonlinearity by integrating the gradient along the path from the baseline input to the actual input, and effectively considers the response of the model to feature changes at different points.

(5) Processing high-dimensional input: A 3D CNN processes volume data, resulting in a high-dimensional input. IG can process such high-dimensional data and provide feature attribution for each voxel in a three-dimensional volume, which makes it suitable for explaining the significance of individual voxels.

(6) Quantitative interpretability: IG generates attribution values, which indicate the magnitude and direction of feature influence. Such quantitative interpretability supports comparison between different features and is helpful for identifying which features have the most significant influence on model prediction.

(7) Insight into model bias: IG can reveal a potential bias in the 3D CNN model by identifying regions or features that contribute disproportionately to some predictions in the input volume. Such an insight is very valuable to ensure fairness and reduce any unintentional bias in the decision-making process of the model.

(8) Visualized saliency map: IG can generate a saliency map, in which the color of each voxel represents its attributable fraction. These maps provide intuitive visualization for the significance of features, and enable the user to quickly identify significant regions in the three-dimensional volume.

(9) Consistency with human perception: In the fields of medical images and other commonly used 3D CNNs, IG has been proved as being capable of producing attribution consistent with human experts' explanation. This consistency with human perception enhances the interpretability and credibility of the decisions made with the model.

Figure 5:
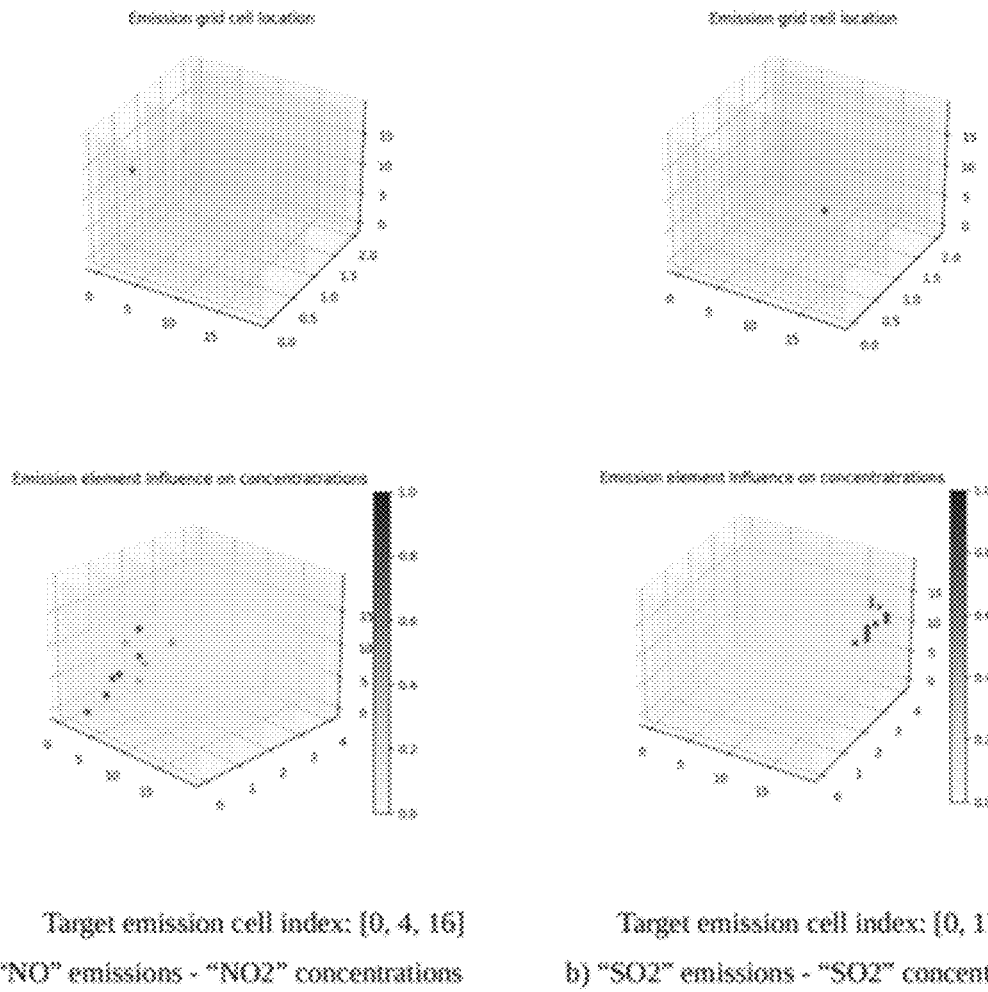
FIG. 5 shows estimated values of the influence of emission elements on concentration.

FIG. 5 shows the visualized results of the estimation of the influence of emission elements on the concentration. The image in the first row shows a target cell of the selected emission grid, which is an input to the model. For a given emission element, the influence of the given emission element on the concentration is estimated. The image in the second row shows the influence of the selected emission element at different locations on the concentration. The Top_k cells (Top_k=10 is used in this method) are highlighted and represent the locations where the concentration is affected the most. The influence values are normalized to the range of 0 to 1, and the sign (positive or negative) of the influence value may also be checked.

Return to FIG. 5($b$). In FIG. 5, the situation (b) "$SO_2$" emission-"$SO_2$" concentration is considered. The index of the selected target emission cell is [0, 17, 15]. After the gradient is calculated, the Top_k elements having the highest influence are located at: [(4, 18, 10), (3, 18, 11), (4, 18, 11), (4, 16, 13), (4, 16, 12), (3, 19, 13), (3, 18, 10), (2, 19, 13), (4, 17, 12), (3, 18, 12)]. That means that the selected emission cell has the greatest influence on the concentrations at the 10 locations. The influence values may also be evaluated.

EXAMPLES (1) Estimating the Pollutants Concentration from the Emission.

In order to evaluate the results of the selected method, a target city (Chengdu as an example, the latitude and longitude of Chengdu is: (30.6598628, 104.0633717)) is selected in this method. The evaluation is performed on a randomly selected timestamp. In this method, the pollutant results of "NO" emission-"$NO_2$" concentration is described in detail. The index of the cell to which Chengdu belongs in the raw grids is [83, 86]. A 20×20 frame is slid to align the center of the frame with the cell [83, 86] in the raw data grids.

A 720×720 km region covering the urban area and surrounding areas of Chengdu is selected, and the corresponding sub-grid data can be directly used in the model and used for further analysis.

Figure 6:
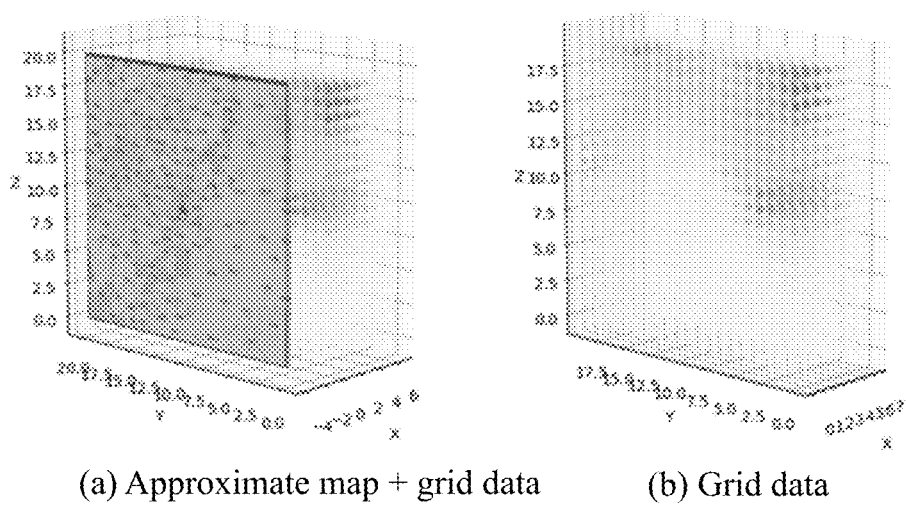
FIG. 6 shows 8×20×20 sub-grids (including the concentration distribution in the region)

Please refer to FIG. 6, which shows the distribution of three-dimensional emission grids in the 720×720 km region covering the urban area and surrounding areas of Chengdu. After receptor points are selected at desired locations, the research and analysis on the contributions of emissions can be carried out. Firstly, a unit grid with some non-zero values can be selected as a receptor point in the (8×20×20) concentration grids, and the emission grids that have the greatest influence on the grid cell can be estimated.

Now, a cell with some non-zero concentration values can be selected as a target cell. The target cell is (0, 1, 14).

In order to evaluate the appropriateness of the model, the actual value and the predicted value of the selected cell can be compared: the concentration value is 0.022926, and the predicted value is 0.035864. Although these values are normalized, it can be seen that the predicted value is very close to the actual value. That result means that the model produces an appropriate result for a given cell. That fact is very important, because it ensures the rationality and accuracy of analysis with the model.

Figure 7:
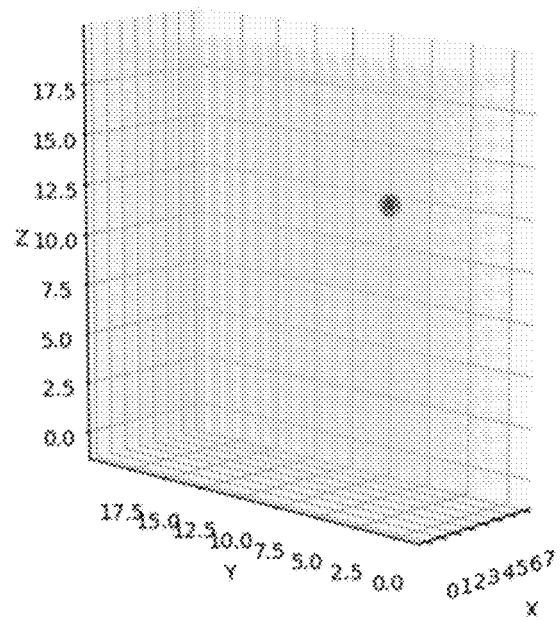
FIG. 7 shows the position of a target cell (0, 1, 14) in the (8×20×20) grids.

Please refer to FIG. 7. The actual location of the target cell is (latitude: 33.585957, longitude: 105.248352). In this way, it can be verified that the prediction of the model on the given location is accurate through the comparison with the actual value, and it lays a foundation for the subsequent explanatory analysis. For the purpose of model training, when the levels in the hierarchy are paired and merged, the actual locations in the raw collocated grids are (0, 84, 100) or (0, 84, 100) and [83+1, 86+14] or [84, 100] in the horizontal direction, and two locations 0 or 1 in the vertical direction. In this method, an Integrated Gradients method is used to find out the attribution of each cell in the input emission grids. The results are normalized, and the influence percentages are calculated. By setting the top_k value, the top k cells with the highest contribution values in the emission grids can be selected. For the purpose of display, top_k is set to 20 in this method.

Figure 8:
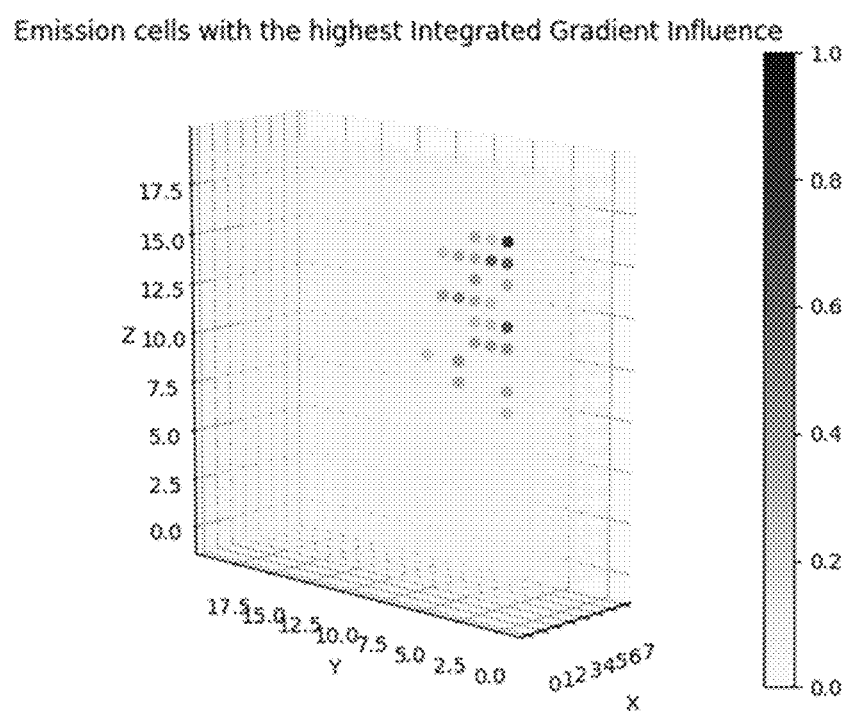
FIG. 8 shows the positions of the top_k emission cells in the (8×20×20) grids at the input.
Figure 11:
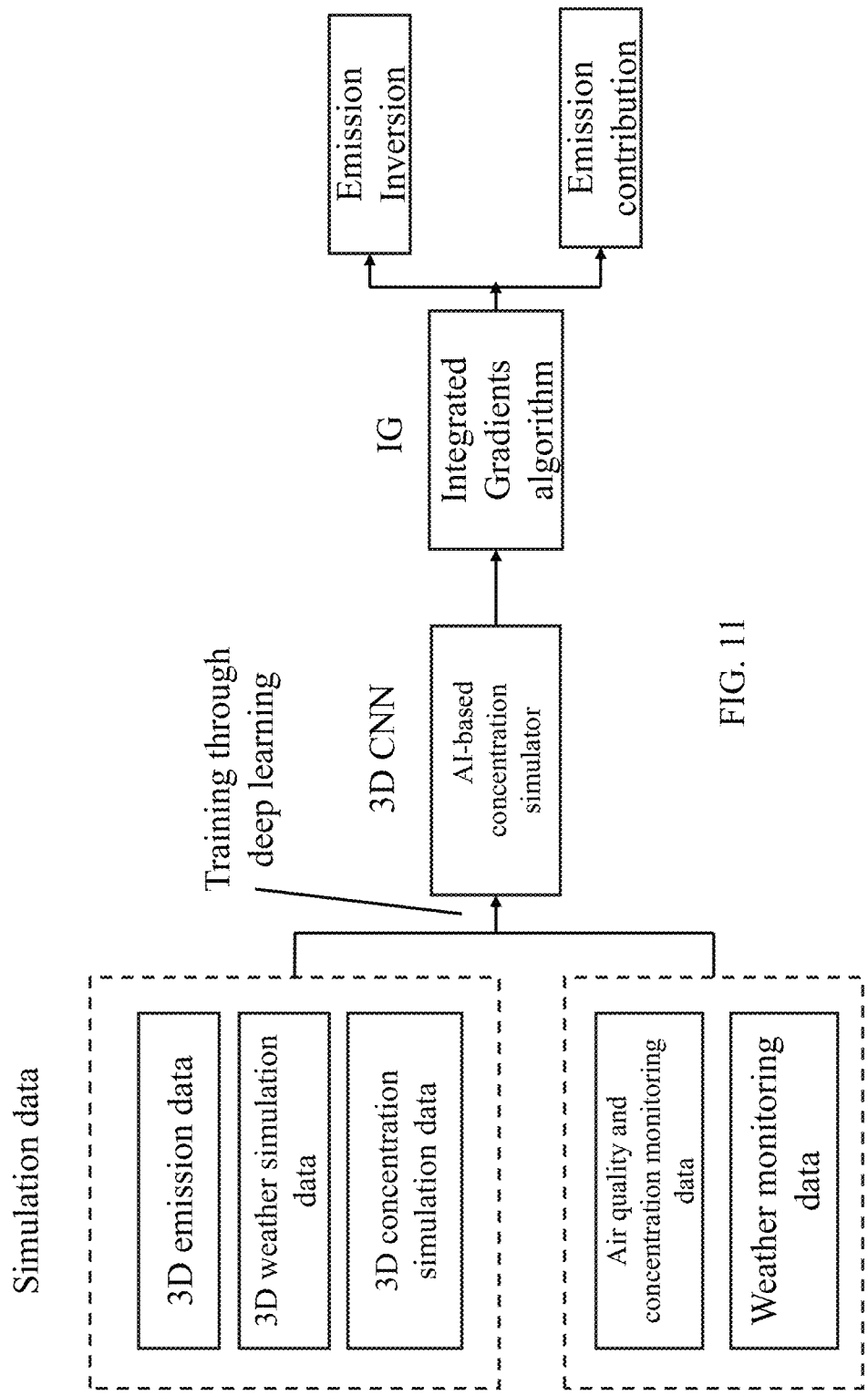
FIG. 11 is a logic block diagram of the method in the present disclosure.

Please see FIG. 8, which shows the distribution (or a heat map) of top_k emissions that contribute the most to the concentration value of the target cell.

By gathering the most influential cell grids in some areas, the actual locations of grids where the top_k emission cells are located can be obtained by means of the map. Please note: in FIG. 11, the coordinate axes has been rotated; consequently, the locations of the cells may look different. That is just a display problem.

In Table 1, the emission cells that have the greatest influence on the concentration of a target cell in the grids are described in detail: indexes of the cell, actual locations of the cell, degree of influence (expressed as a percentage, the relative value is more important than the absolute value), and actual emission values at the selected cells (for reference, the values have been normalized for the entire data set).

TABLE 1

Results of Target Cells (0, 1, 14) in Chengdu Region

| Index | Locations | Influence in % | Actual emissions |
|---|---|---|---|
| 0, 0, 17 | Point 0: Lat: 33.9569, Lon: 106.4208 | 6.483939 | 0.572386 |
| 0, 0, 13 | Point 1: Lat: 33.8988, Lon: 104.8325 | 4.543652 | 0.078032 |
| 0, 0, 16 | Point 2: Lat: 33.9444, Lon: 106.0235 | 4.310166 | 0.157098 |
| 0, 1, 16 | Point 3: Lat: 33.6149, Lon: 106.0394 | 4.062361 | 0.073821 |
| 0, 3, 14 | Point 4: Lat: 32.9273, Lon: 105.2859 | 3.021410 | 0.041215 |
| 0, 0, 12 | Point 5: Lat: 33.8810, Lon: 104.4358 | 2.807059 | 0.047599 |
| 0, 3, 11 | Point 6: Lat: 32.8745, Lon: 104.1099 | 2.684951 | 0.406367 |
| 0, 2, 15 | Point 7: Lat: 33.2717, Lon: 105.6611 | 2.660859 | 0.031270 |
| 0, 1, 12 | Point 8: Lat: 33.5518, Lon: 104.4579 | 2.528214 | 0.040070 |
| 0, 4, 14 | Point 9: Lat: 32.5981, Lon: 105.3045 | 2.524137 | 0.039308 |
| 0, 2, 12 | Point 10: Lat: 33.2226, Lon: 104.4799 | 2.502890 | 0.053939 |
| 0, 3, 10 | Point 11: Lat: 32.8544, Lon: 103.7182 | 2.319062 | 0.403630 |
| 0, 2, 16 | Point 12: Lat: 33.2854, Lon: 106.0551 | 2.207822 | 0.031660 |
| 0, 0, 10 | Point 13: Lat: 33.8414, Lon: 103.6429 | 2.157714 | 0.052806 |
| 0, 2, 17 | Point 14: Lat: 33.2979, Lon: 106.4492 | 2.136544 | 0.041834 |
| 0, 2, 14 | Point 15: Lat: 33.2566, Lon: 105.2672 | 2.124948 | 0.022858 |
| 0, 3, 16 | Point 16: Lat: 32.9560, Lon: 106.0707 | 2.107742 | 0.037597 |
| 0, 0, 15 | Point 17: Lat: 33.9305, Lon: 105.6263 | 2.018816 | 0.045018 |
| 0, 2, 13 | Point 18: Lat: 33.2403, Lon: 104.8735 | 1.738102 | 0.025660 |
| 0, 1, 13 | Point 19: Lat: 33.5695, Lon: 104.8530 | 1.718418 | 0.024768 |

(2) Estimating the Emissions from the Pollutants Concentration

Suppose that a specific grid is to be analyzed, wherein the pollutant concentration exceeds a critical threshold. It is necessary to know emissions at which locations lead to such a concentration level. For example, suppose that the concentration of $CO_2$ is measured, and the result of measurement indicates $C=300$ mg/m$^3$. It is desirable to have a model that can predict the emissions at which locations make contribution to the concentration 300 mg/m$^3$ and the specific percentages of contribution.

Suppose there are only 10 emission sources, and the following results are expected:

| Top K | 1 | 2 | 3 | 4 | 5 | 6 | 7 | 8 | 9 | 10 |
|---|---|---|---|---|---|---|---|---|---|---|
| mg/m$^3$ | 105 | 75 | 30 | 24 | 18 | 15 | 15 | 9 | 6 | 3 |
| % | 35 | 25 | 10 | 8 | 6 | 5 | 5 | 3 | 2 | 1 |

In the above table, the top 10 locations where the emissions have the greatest influences on the concentration of pollutants at the target location are listed in this method. Each cell contributes a certain amount of pollutants to the target cell. Such information can be used to provide valuable suggestions for emission control. Such information can be used to investigate the possible causes for the increase of pollutant concentration, or to prevent the increase of pollution level with better emission control measures.

Essentially, it is desired that the method should approximate the following mapping:

$$f(\{(E_0,W_0),(E_1,W_1),(E_2,W_2),(E_3,W_3), \ldots, (E_n,W_n)\})=\{S_0,S_1,S_2,\ldots,S_n\}$$

wherein:

E-emission, W-weather condition, f-function to be approximated, S-score of contribution.

The scores of contributions follow the following assumptions:

$$S_0 \times C + S_1 \times C + S_2 \times C + \ldots + S_n \times C = C$$

$$S_0 + S_1 + S_2 + \ldots + S_n = 1$$

This method uses a deep neural network, and the data set used for training includes weather condition, pollutant emission and concentration. The same Integrated Gradients (IG) as described above is used to estimate the influences of input features on output features. IG includes three parts:

1) Interpolating small steps on a straight line between 0 (baseline or starting point) and 1 (input emission value) in a feature space;
2) Calculating the gradient of each step of model prediction related to each step;
3) Approximating the integral (cumulative average) between the baseline and the input by accumulating these local gradients.

Finally, the calculated integrated gradients are normalized on the entire grid.

(3) Estimating the emission from given pollutant concentration and weather data Based on the previous 3D DNN and IG, this method uses an optimization method of back propagation to directly optimize the input to meet the constraints imposed by the model and mathematical definition:

$$g(\{(E_0,W_0),(E_1,W_1),(E_2,W_2),(E_3,W_3), \ldots, (E_n,W_n)\})=\{C_0,C_1,C_2,\ldots,C_n\}$$

Here, the function g is differentiable, $W_n$ and $C_n$ are constants, $E_n$ is an optimization variable, and is a non-negative value.

The results of the model and analysis in some cases are provided below:

Jingmen City, Hubei Province is selected as a case for studying the traceability with deep learning technology. Please refer to FIG. 9, which shows the results of a $SO_2$ traceability model and analysis based on deep learning in Jingmen City. FIG. 9(a) shows distribution of a given $SO_2$ emission region as an input to the deep learning model, and FIG. 9(b) shows the result of the distribution of $SO_2$ emission regions predicted based on traceability of deep learning technology. As can be seen from FIG. 9, the $SO_2$ emission prediction result based on deep learning technology is well consistent with the input emission distribution, but the magnitudes of emission in different grids are optimized and adjusted based on deep learning, thereby the simulation result of the model is closer to the observed $SO_2$ result.

Jingmen City, Hubei Province is selected as a case for studying the traceability with deep learning technology. Please refer to FIG. 10, which shows the results of a $NO_2$ model and analysis based on traceability of deep learning in Jingmen City. FIG. 10(a) shows a distribution of a given $NO_2$ emission region as an input to the deep learning model, and FIG. 10(b) shows the result of the distribution of $NO_2$ emission regions predicted based on traceability of deep learning technology. As can be seen from FIG. 10, the $NO_2$ emission prediction result based on deep learning technology is well consistent with the input emission on distribution, but the magnitudes of emission in different grids are optimized and adjusted based on deep learning, thereby the simulation result of the model is closer to the observed $NO_2$ result.

The content that is not described in detail in this specification belongs to the prior art well known to those skilled in the art.

The invention claimed is:

1. An inversion method for determining a pollution source list based on artificial intelligence and big data, comprising:
   acquiring weather data, emission data and concentration data from satellites and ground monitoring data sources, and preprocessing the three types of data utilizing a computer-driven simulator comprising a non-transitory memory and a processor to store data and execute instructions;
   obtaining an emission source that makes the highest contribution to the pollutant concentration of any cell with a 3D Convolutional Neural Network (3DCNN) artificial intelligence algorithm utilizing the simulator, and establishing a model of the relationship between pollutant concentration and emission;
   utilizing the simulator to analyze the relationship model with an Integrated Gradients method to estimate influences of input emission data on concentrations of specific cells, and obtaining a final list inversion result;
   wherein the step of obtaining an emission source that makes the highest contribution to the pollutant concentration of any cell with a 3DCNN artificial intelligence algorithm and establishing a model of the relationship between pollutant concentration and emission comprises:
   reducing the dimensions of weather data from 5 to 1 through the processing of two-dimensional convolution layers, and then activating a ReLU;
   reshaping the weather data to match the shape of the emission data in three dimensions;
   cascading the three-dimensional emission data with the weather data to form data in a shape processed by a set of three-dimensional convolution layers having an activation function;
   the inversion method further comprising a step of predicting emission concentration through a recurrent neural network RNN by using a plurality of timestamped record sequences of emission data cascaded with weather data as inputs;
   wherein the step of analyzing the relationship model with an Integrated Gradients method to estimate influences of input emission data on concentrations of specific cells comprises:
   using "zero feature" state as a baseline;
   calculating gradients of model outputs with respect to input features at an actual input and the baseline input, and obtaining the gradients through back propagation in a 3DCNN model;
   dividing a path from the baseline to the actual input into N equally-spaced points; for each point in the path, calculating the gradient of model output with respect to the input features; and for each evaluation point, calculating a difference between the gradient at the actual input and the gradient at the baseline input;
   wherein the differences indicate how the significance of each feature varies along the path from the baseline to the actual input;
   multiplying the gradient differences with corresponding weights in a Gauss-Legendre quadrature formula, and summing up all weighted gradient differences to obtain a final attributable fraction of each feature;
   wherein the fractions indicate the degree of contribution made by each feature to the prediction of the model for a given input; and
   wherein the attributable fractions are normalized to ensure that a sum of the final attributable fractions of each feature is equal to the difference between the prediction of the model at the actual input and the prediction of the model at the baseline input.

2. The inversion method for determining a pollution source list based on artificial intelligence and big data of claim 1, wherein the step of acquiring weather data, emission data and concentration data, and preprocessing the three types of data comprises:
   parsing three types of data files and using timestamp information to prepare emission-weather-concentration samples;
   then, normalizing the three types of data to a range of 0 to 1; and
   segmenting the three types of data into three-dimensional data grids.

3. The inversion method for determining the pollution source list based on artificial intelligence and big data of claim 2, wherein the step of segmenting the three types of data into three-dimensional data grids comprises:
   setting 8 levels for emission data; setting 8×2=16 levels for concentration data; and
   for each adjacent pair of levels, merging the level data by a summation operation.

4. The inversion method for determining the pollution source list based on artificial intelligence and big data of claim 3, wherein the three-dimensional data grids segmented from three types of data are as follows respectively:
   for emission data, the sample grids are in a shape of (8, 20, 20);
   for concentration data, the sample grids are in a shape of (8, 20, 20); and
   for weather data, the sample grids are in a shape of (5, 20, 20).

5. An inversion system for determining a pollution source list based on artificial intelligence and big data according to claim 1, comprising:
- an acquisition model configured for acquiring weather data, emission data and concentration data, and pre-processing three types of data;
- a calculation model configured for obtaining an emission source that makes the highest contribution to the pollutant concentration of any cell with a 3DCNN artificial intelligence algorithm and establishing a model of the relationship between pollutant concentration and emission; and
- an estimation module configured for analyzing the model of the relationship with an Integrated Gradients method to estimate influences of input emission data on concentrations of specific cells, and obtaining a final list inversion result.

6. A simulator, comprising a memory and a processor, wherein the memory stores computer instructions, and the processor is used to execute the computer instructions stored in the memory, so as to implement the steps in the inversion method for determining the pollution source list based on artificial intelligence and big data of claim 1.

* * * * *